Figure 1:
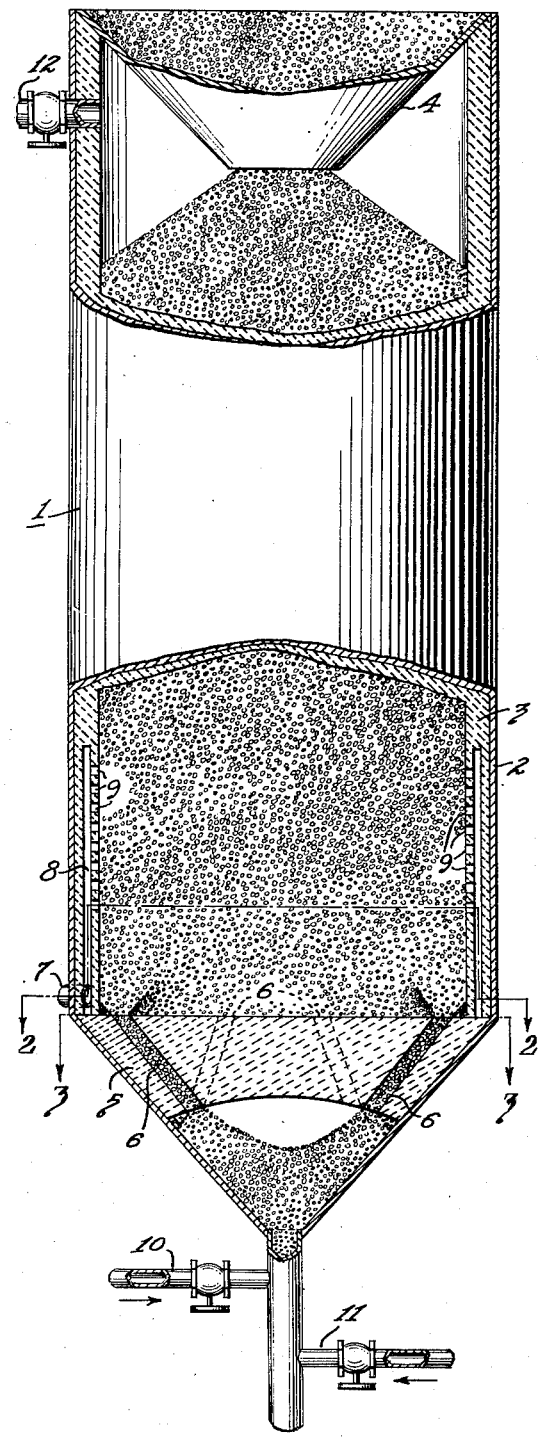

May 13, 1952  H. A. SHABAKER  2,596,609
SULFIDATION OF MINERALS
Filed Feb. 6, 1948

Inventor
HUBERT A. SHABAKER
By Gordon A. Kessler
Attorney

Patented May 13, 1952

2,596,609

UNITED STATES PATENT OFFICE 2,596,609

SULFIDATION OF MINERALS

Hubert A. Shabaker, Media, Pa., assignor to Houdry Process Corporation, Wilmington, Del., a corporation of Delaware Application February 6, 1948, Serial No. 6,722

19 Claims. (Cl. 23—110)

The present invention relates to improved methods for sulfidation of materials such as minerals. It is particularly concerned with the preparation of improved clay products by methods including sulfidation, especially when followed by removal of iron sulfides thus formed, obtaining modified clay masses particularly useful as catalysts in hydrocarbon conversion processes.

In copending applications Serial No. 644,423, filed January 30, 1946, and 681,426, filed July 3, 1946, (filed jointly in the names of myself, George Alexander Mills and Ruth C. Denison) now issued respectively as Patents Nos. 2,466,048 and 2,466,052, issued April 5, 1949, methods are described for the production of modified clay masses providing catalysts of unique properties, by treatment of iron-containing clays with sulfiding gases at elevated temperature followed by the removal of the iron sulfide thus formed. The novel contact masses thus obtained are changed in physical and chemical properties and demonstrate important advantages as catalysts, including exceptional stability in cracking or treating petroleum stocks of high sulfur content.

In my copending application Serial No. 774,439, filed September 16, 1947, now Patent No. 2,561,442, issued July 24, 1951, certain improved methods for sulfidation of clay are described, employing a hot gaseous carrier medium for dilution of the active sulfiding gas and providing the necessary heat for bringing the clay to required temperature for sulfidation.

By the present invention further improvements in the sulfidation procedure are obtained, affording important advantages of enhanced efficiency and economy of operation, which improvements are adapted to commercial utilization for the large scale production of modified clay products of uniformly good quality.

In accordance with the present invention the sulfidation of an iron-containing clay or other mineral is carried out in at least two stages, wherein in an initial stage the clay or mineral is heated to desired high temperature by contact with an essentially inert gaseous medium carrying a comparatively small quantity of active gaseous sulfide, such as $H_2S$ or $CS_2$, and the thereby heated and partially sulfided clay then contacted for a short time with concentrated sulfiding gas to perfect or assure completion of the sulfiding reaction. The sulfided clay is subsequently cooled and subjected to acid-leaching, principally effecting thereby removal of the iron sulfides formed. By this operation complete and uniform sulfiding of the clay is obtained using only fairly small amounts of active sulfiding gas for reaction with the iron content of the clay, affording, among other advantages, the best economy in the use of the sulfiding gas. The resulting sulfided clays are capable of being easily leached with acid to provide modified clay products of low iron content and of uniformly high and stable catalytic activity.

The process of the invention may be operated simply as a batch method by employing a suitable reaction chamber for retaining the clay and providing the chamber with means for introducing streams of gases of different composition or concentration under manual or automatic control, or if desired one or the other of the treating stages may be applied as a continuous operation. For instance the clay may be passed through a primary heating and treating zone and discharged into one or more receptacles wherein the second stage treatment is carried out batchwise.

It is preferred, however, in commercial operation, to employ a completely continuous process, such as a system wherein the catalyst moves counter to the treating gas through the several treating stages. Thus, a heated carrier gas may be admitted into the reactor containing a moving bed of clay at a location in the system ahead of the point of entry of the sulfiding gas, thereby providing a period during which the clay is initially heated by contact with the gas to desired reaction temperature. During this period the clay is in contact with hot gas of low sulfide concentration, as will be described, and the thus sulfided or partly sulfided clay is then contacted for a short period as it moves through the reactor with the more highly concentrated sulfiding gas completing the sulfidation of any unsulfided portions thereof. Examples of various embodiments and particular forms of apparatus of the continuous type that may be employed in carrying out the multistage sulfidation described, are disclosed in my copending application Serial No. 6,683 filed of even date herewith. For convenience, details of operation of the present method are hereinafter described with reference to the accompanying drawings, illustrating one type of continuous apparatus that can be employed in practice of the invention.

In accordance with the improved process of the present invention, the clay is heated up to required temperature and most, if not all, of the iron is reacted in the first stage during contact with large volumes of dilute sulfiding gas serving also to rapidly flush from the clay undesirable reaction or calcination products, and the thus sulfided clay is then subjected to further sulfidation in a later stage with only a small volume of concentrated sulfiding gas. The subsequent treatment with the concentrated sulfiding gas provides a "cleanup" or equalizing step ensuring complete sulfidation of the iron content of the clay and compensating for any irregularities that might be experienced during operation of the previous stage. Such irregularities in operation during the first stage may result from gas channelling, imperfect mixing of non-uniform mixtures of active sulfide and carrier gas, non-uniformity of time of contact due to differences in flow rate of the clay over the cross sectional area of the reactor, or other conditions that might be encountered in practical operation.

The described two stage treatment, in addition, results in important economies in heating costs and in total sulfiding gas. During the initial heating stage small amounts of sulfide gas may be used, even less than theoretically required for complete sulfidation. The required reaction can then be easily completed with high concentrations of sulfide gas in a comparatively low bulk volume. The sulfiding reaction is apparently endothermic, and it is therefore advantageous to effect at least an appreciable part of the reaction in the presence of the heating gas.

Formation of detrimental products of sulfidation, if any, takes place at the upper portion of the reactor in the region of lowest temperatures and in the presence of large volumes of gas serving to flush these detrimental products from the reactor, thereby minimizing any undesired effects on the sulfided clay.

Figure 2:
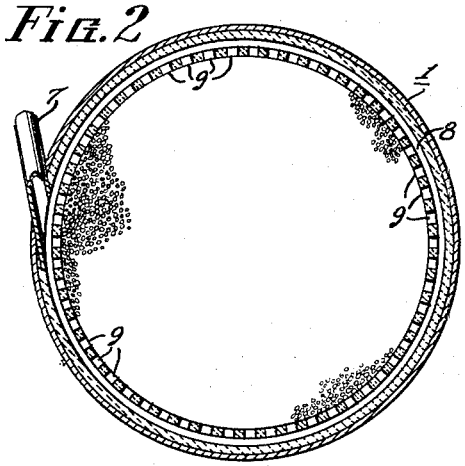
Figure 3:
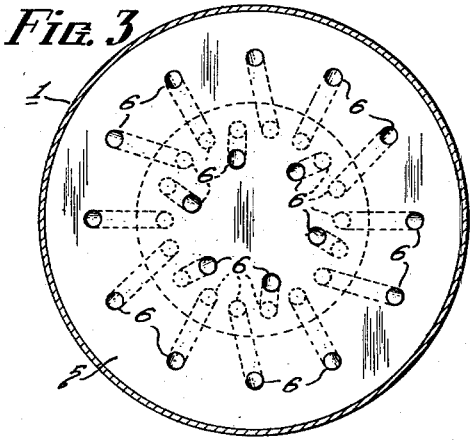
Figures 4, 5:
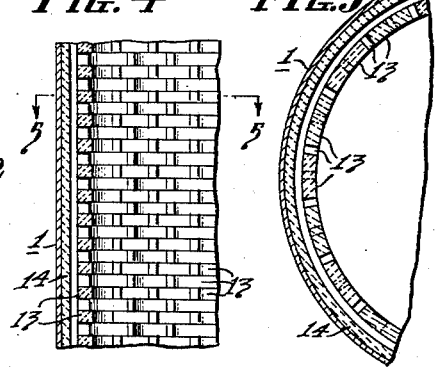

The accompanying drawings which are largely diagrammatic, illustrate one type of continuous treater adapted for use in practice of the invention, wherein Figure 1 is a view in elevation, with parts of the wall broken away to show the construction thereof and portions of the interior of the apparatus shown in cross-section; Figure 2 is a horizontal cross-section thereof taken along the line 2—2 of Figure 1; Figure 3 is a horizontal cross-section of the lower portion of the reactor taken on line 3—3 of Figure 1; Figure 4 is a partial view illustrating a modified form of grid wall that may be substituted in the reactor of Figure 1; and Figure 5 is a horizontal cross-section thereof taken along the line 5—5 of Figure 4.

Referring now particularly to Figure 1, there is shown generally a treater or reactor 1, which is preferably cylindrical at its upper section formed by the perimetric wall 2, which may be constructed of any suitable material. Since the temperature of sulfide gas in this section is quite high, a refractory lining of the inner walls is provided as shown at 3; this lining should be employed at least at those parts of the reactor wall coming into contact with high temperature sulfide gas. The clay is introduced at the top of the reactor by any suitable means such as a hopper 4, supplied by a chute, moving conveyor, or other means (not shown). From the hopper, the clay passes downwardly by gravity as a moving bed through the reactor entering a zone of narrowed cross-section at and below the distributing member 5, by passing through distributing down-comers 6 formed or inserted in that member, also preferably made of material, such as ceramic, resistant to corrosive gases.

Heating gas is introduced through a supply pipe 7 (Figure 2) entering through the wall of the reactor and terminating at a circumferential channel 8 formed in the liner 3. The supply pipe 7 is substantially tangential to the channel so as to impart a swirling action to the gas introduced. The inside wall of the liner 3 over a portion of the longitudinal extent of the channel is provided with a grillwork or grid section furnishing suitable openings 9 for admission of the gas into the reactor, such as by means of horizontally or vertically disposed slots, or reticulated or perforated grids. By the construction shown, the hot gas in the circumferential channel 8 serves to maintain the mineral particles being heated at their attained temperature without heat loss through the wall.

At the discharge end of the reactor 1, means are provided for introduction of the concentrated sulfide gas, entering through a supply line 10 and passing upwardly, in counter-current relation to the moving clay particles, through the down-comers 6 into the main chamber of the reactor. To prevent discharge of sulfide gas, with the clay, an inert seal gas may be introduced at a pressure slightly above that present at the base of the treater, as at 11, thereby opposing downward flow of the sulfide gas. Only about 5 to 10% of the seal gas thus introduced need flow upward to accomplish this result, the remaining seal gas being discharged concurrent with the treated clay.

In the embodiment illustrated in Figures 4 and 5, the grid section instead of being integral as in Figure 1, is shown as formed of spaced tiles 13, providing openings therebetween for admission of the heating gas, similarly to the openings 9 of Figure 1.

As the sulfide gas introduced through line 10 passes upwardly it comes into contact and is admixed with the hot gas introduced through the openings 9 in the grid wall (or through the spaces between the tiles 13). The hot gas being introduced at a rate and pressure causing horizontal movement toward the center of the reactor and being forced upwardly by the positive movement of the active sulfiding gas entering through the passages 6, good mixing of the gas can thus be obtained to provide a quite uniform dilute sulfide gas for heating and effecting initial sulfiding of the clay. The spent gases may be withdrawn through a suitable discharge line such as is shown at 12, to waste, or may be recovered for reuse in this process or for other industrial purposes.

In the construction of the apparatus illustrated, or other types of apparatus that may be substituted, provision is thus made for securing the desired mixture of sulfiding gas and heated carrier gas constituting the dilute treating gas for the first stage treatment, as a result of the flow or diffusion of a portion of the concentrated sulfide gas from the later treating stage; the construction being such as to minimize channelling. It is preferred in practice, however, to further assure sulfidation of the clay throughout the cross-section of the reactor, to add at least a small portion of sulfide gas with the carrier gas directly introduced into the reactor in the first stage; for example, by admission of the carrier gas together with the desired portion of sulfiding gas through line 7 in the illustrated apparatus.

The concentrated sulfide gas introduced in the second stage, whether in a batch or continuous process, need not be at a high temperature. Since the clay is already heated to required temperature as a result of the first stage treatment;

and only small amounts of total gas and a comparatively short time is employed for the second stage, ordinary temperature may be employed including room temperature or lower. In fact, reduction in temperature of the clay during the second stage sulfidation treatment may be advantageous from the standpoint of cooling, which is necessary before the sulfided clay can be leached.

The heating gas serving also as the carrier gas for the dilution of the $H_2S$ or $CS_2$ particularly for use in the first stage of the treatment of the clay must be essentially inert; that is, it must be free from oxidizing constituents which would consume the active sulfiding gas, and also free from other constituents in amounts which would interfere with the sulfidation reaction or be harmful to the catalyst. Commercial nitrogen is an example of a gas substantially fulfilling these requirements.

Another essentially inert heat carrier gas, which is comparatively cheap and readily made available, is a specially processed or prepared flue gas, which may be obtained for instance by the controlled combustion of a fuel. Gaseous fuels are preferred because of easier control of combustion; examples of such gaseous fuels which may be burned to provide flue gas, include propane, and domestic heating gas. Such flue gases from commercial propane, for instance, can be readily prepared free of oxygen, but would then contain components such as water vapor, $CO_2$, and generally small amounts of CO and $H_2$ in addition to nitrogen. In the case of the single step process of sulfiding clays with diluted sulfide gas as described in my copending application Serial No. 774,439, the quantity of carbon dioxide that may be present in the treating gas is limited because of the adverse effect of large quantities of carbon dioxide on the sulfidation reaction and on the subsequent acid leaching of the clay. As therein described, in the use of such flue gas, the carbon dioxide content can be substantially eliminated or reduced to practically non-interfering concentrations by caustic wash or by treatment with amines. The adverse effect of large quantities of $CO_2$ in the order of 10 to 15% by volume of the carrier gas, moreover, can be largely counteracted by using larger concentrations of active sulfide gas in the carrier gas than the theoretical equivalent required to react with the iron content of the clay, preferably 3 to 4 or more times the calculated equivalent.

In following the two-stage treatment of the present invention, the adverse effect of $CO_2$ in the treating gas becomes considerably less important, in view of the final treatment with the concentrated sulfiding gas. Effective sulfiding followed by good acid leaching can be obtained with flue gas compositions containing 12–15% or more (by volume) $CO_2$ and only very small concentrations of sulfide gas, in the order of 0.5% to 1% $H_2S$ (of the total volume of treating gas), followed by a short treatment of the clay in more concentrated sulfide gas, preferably about 25 to 50% by volume of the treating gas; the total quantity of sulfide employed, need be only slightly in excess of the theoretical equivalent of the iron content of the clay.

During the first stage treatment wherein the clay is being heated to desired temperature, comparatively large amounts of treating gas are required. Under practical counter-current heating conditions, it has been found that about 1000 to 1300 volumes of flue gas are required to heat 1 volume of clay (such as an acid-activated sub-bentonite weighing 45 lbs. per cu. ft.) from room temperature to 1400° F., the time required depending upon the rate at which the gas is admitted. The rate of admission of the heating gas has no noticeable effect on the sulfidation reaction, provided it is high enough to heat the clay to desired reaction temperature. After the clay has been heated to the desired temperature for sulfidation, only about a half hour or less may be required for obtaining complete reaction with the iron content of the clay; nevertheless it will be found advantageous to retain the clay at the attained temperature for at least 1 hour and preferably for about 2 to 5 hours before subjecting the clay to subsequent treatment with the concentrated sulfiding gas. Extending the time of treatment beyond the indicated time has not been found of any particular advantage; nor, on the other hand has any detrimental effect been noted.

During the later stage "cleanup" treatment 15 to 100% by volume concentrations of gaseous sulfide, such as $CS_2$ or $H_2S$, may be employed; concentrations of from 25 to 50% being preferred. The treatment with the concentrated sulfide gas in the second stage need be conducted for only a comparatively short time, as several minutes; even with low concentrations of sulfide of the order of 10 to 15%, 10 to 30 minutes have been found quite satisfactory.

The carrier gas for the concentrated sulfide treatment, of course, may be of the same or different composition than that employed as heating gas in the first stage; for simplicity of practical operation, however, it is preferred to employ the same carrier gas. In employing the continuous process of the type illustrated, dilution of the 100% or other concentrations of hydrogen sulfide gas introduced through line 10, is obtained by adjusting the rate and volume of seal gas introduced through line 11, so that the upwardly directed portion will admix with the hydrogen sulfide to furnish the desired ultimate concentration for the "cleanup" treatment. Thus, the upwardly flowing portion of the seal gas joined by one-third to equal volumes of sulfide gas will form a combined gas stream of 25 to 50% sulfide concentration for the "cleanup" operation.

To obtain good sulfiding action and ready removal by mild acid leaching of the formed iron sulfide, the treating gases should be substantially free from uncombined oxygen and from water. A maximum moisture content of 0.02 volume percent of the described flue gas used as diluent and heating gas is readily obtained by passing the same over silica gel dessicant. By burning of fuel gas in air as heretofore described, satisfactory utilizable flue gas compositions can be obtained, ranging from substantially complete combustion (0.6% $O_2$, no $H_2$ or CO) to a moderately reducing gas (containing 6.4% CO, 4.0% $H_2$, 9.8% $CO_2$). Upon heating of a gas containing $CO_2$ and $H_2$ to temperatures in the order of 1200–1400° F., a "water gas reaction" can occur, with the formation of CO and $H_2O$. As the flue gas is made more reducing in terms of $H_2$ the theoretical equilibrium moisture content is increased. No adverse effect has been noted, however, in the use of a flue gas giving a calculated equilibrium water content of approximately 1.8% in the first stage treatment; nor from about 5% calculated equilibrium $H_2O$ in the "cleanup" treatment.

In the preferred operation of the continuous process described, the concentrated sulfide gas from the "cleanup" section was permitted to enter the main treating section for use therein. It will be apparent, that if desired, this gas may be vented from the reactor, and all of the desired concentration of sulfide gas separately furnished for the first stage treatment.

EXAMPLE I

In this series of runs in batch operations, a gaseous mixture having the composition of a readily prepared flue gas was employed containing 2.5% $H_2$, 0.5% CO, and about 11.5% $CO_2$ (all by volume) the remainder being inert gas composed almost entirely of $N_2$. To this gas composition small amounts of hydrogen sulfide were added for the first stage treatment giving respective concentrations of 0.7 and 1.4 vol. percent $H_2S$. The treatment was conducted for various periods of about 1½ to 10 hours as indicated in the following table; the gas being admitted at 1400° F. and at the rate of 3 to 4 volumes of gas per volume of catalyst per minute.

In the second stage 15 vol. percent to 50 vol. percent $H_2S$ was employed with the same flue gas composition as in the first stage, for periods of 5 to 15 minutes.

The clay treated was a pelleted commercial acid-activated sub-bentonite (Filtrol) containing iron (2.1% $Fe_2O_3$). In all instances after acid leaching the sulfided clay with dilute aqueous HCl (15% conc.) for 24 hours at room temperature, catalyst pellets of fairly uniform color, of acceptably low residual iron content, and having good catalytic properties were obtained. The activity of the catalyst was tested by the "CAT-A" method described by H. J. Alexander and H. G. Shimp in National Petroleum News, technical section, August 2, 1944, pp. R537-8.

commercial acid-activated montmorillonite clay (1.51% $Fe_2O_3$) with this gas containing 0.7 vol. percent $CS_2$ at 1400° F. for 5 hours in the 1st stage, followed by a 15 minute treatment with the same carrier gas containing about 30–31 vol. percent $CS_2$, and room temperature acid leaching as before, catalysts were obtained of less than 0.2% residual $Fe_2O_3$ and having an activity by the CAT-A method of 38–41 volume percent gasoline.

The quantity of sulfide stoichiometrically required to react with the iron content of the clay may be postulated as based on either of the following reactions:

$$Fe_2O_3 + 3H_2S \rightarrow Fe_2S_3 + 3H_2O$$
$$Fe_2O_3 + 3H_2S \rightarrow 2FeS + 3H_2O + S$$

EXAMPLE III

Effective sulfidation and the desired extent of iron removal from the clay (less than 0.1 to 0.15% residual $Fe_2O_3$) were obtained in continuous 2-stage operation over a wide range of conditions, with the total hydrogen sulfide feed amounting to about 2½ times the theoretical requirement in accordance with the above equations, with maximum temperatures ranging from about 1350 to about 1450° F. These varied conditions included the introduction of all of the hydrogen sulfide used to the "cleanup section" at a concentration therein of about 65% by volume of total gas and constituting about 2.5 times the theoretical requirement, as well as the introduction of a portion of the hydrogen sulfide directly with the heating diluent gas in concentrations from about 0.75 to 2.0% of the total heating gas stream introduced. The clays treated included the commercial acid-activated and calcined montmorillonite pellets used in the preceding example, as well as dried but uncalcined acid-activated similar clay extruded to pellets of high density (0.70 kg./lit). The calcined as well as the uncalcined clay were equally well sulfided.

*Table 1*

| Stage 1 Oper. | | Weight ratio $H_2S$/$Fe_2O_3$ | Stage 2 Oper. | | Weight Per Cent $Fe_2O_3$ in leached clay | CAT-A Yields | | |
|---|---|---|---|---|---|---|---|---|
| Vol. Per Cent $H_2S$ | Time hrs. | | Vol. Per Cent $H_2S$ | Time min. | | Gaso Vol. Per Cent | Coke Weight Per Cent | Gas Weight Per Cent |
| 0.7 | 5 | 0.83 | 15 | 5 | 0.14 | 40.2 | 3.2 | 8.9 |
| 0.7 | 5 | 0.83 | 15 | 15 | 0.09 | 40.1 | 3.3 | 8.3 |
| 0.7 | 5 | 0.83 | 25 | 10 | 0.14 | 37.0 | 3.4 | 8.6 |
| 0.7 | 5 | 0.83 | 50 | 5 | 0.16 | 39.7 | 3.4 | 8.5 |
| 0.7 | 5 | 0.83 | 50 | 15 | 0.10 | 39.9 | 3.2 | 8.0 |
| 1.4 | 5 | 1.65 | 15 | 15 | 0.08 | 38.5 | 3.3 | 9.7 |
| 1.4 | 5 | 1.65 | 50 | 15 | 0.07 | 38.0 | 3.3 | 8.3 |
| 2.1 | 1.6 | 0.83 | 25 | 10 | 0.21 | 37.4 | 2.7 | 7.2 |
| 0.35 | 10 | 0.83 | 25 | 10 | 0.24 | 38.3 | 2.3 | 9.2 |

EXAMPLE II $CS_2$ was substituted for $H_2S$ in a flue gas composition such as that described in the preceding example. Treatment of another sample of a Typical results are shown in the following table, obtained with nitrogenous flue gas containing about 12 to 14% by volume $CO_2$ and some $H_2$ and CO (up to about 3 to 4%).

*Table 2*

| Max. Temp. °F. | Time above 1350°F. (Hours) | $H_2S$ Rates | | | Inert Gas in First Stage Cu. ft./lb. Clay | Weight Percent $Fe_2O_3$ (dry basis) in Leached Clay | Activity (Vol. Percent Gasoline) CAT-A |
|---|---|---|---|---|---|---|---|
| | | Percent in Main Stream (Vol.) | Quan. in Main Stream (Times theor.) | Vol. Percent in Clean-up Gas | | | |
| 1,415 | 5.5 | 0.74 | 2.1 | 50 | 28 | 0.08 | 38.6 |
| 1,390 | 5.0 | 2.0 | 6.1 | 50 | 29 | 0.09 | 41.5 |
| 1,380 | 0.5 | 1.2 | 2.5 | 50 | 21 | 0.14 | 40.4 |
| 1,335 | 2.5 | 0. | 0. | 65 | 32 | 0.08 | 40.8 |
| 1,360 | 2.0 | 1.4 | 3.8 | 25 | 28 | 0.12 | 41.7 |
| 1,365 | 0.5 | 1.4 | 3.5 | 50 | 25 | 0.11 | 40.9 |

Other continuous treater runs made with wider variation of the flue gas employed, (e. g. 9.8% $CO_2$, 4.0% $H_2$ and 6.4% CO by volume) as well as by addition of up to 5% $H_2$ to the gas in the cleanup section, showed similar results, obtaining clay residues of less than 0.1% $Fe_2O_3$ showing activity of approximately 40% by volume gasoline by the CAT-A method. Use of a flue gas containing 0.6% oxygen and free from $H_2$ and CO (13.8% $CO_2$) produced catalysts of above 40% gasoline activity and containing about 0.11% $Fe_2O_3$; there was evidence, however, of some exothermic reaction. In several runs using undried flue gas containing up to 2.6% $H_2O$ by volume, the residual iron after acid leaching was somewhat higher being between 0.15 to about 0.20% $Fe_2O_3$; the CAT-A gasoline activity was not noticeably affected.

By the two stage operation employing fairly dilute sulfide gas in the first stage, in addition to the advantages already set forth, all of the advantages of dilute sulfide gas over the use of 100% sulfide gas (or highly concentrated sulfide gas) are retained, including greater facility of complete removal of "freed" iron by room temperature acid leaching, more economic use of expensive sulfide gas, minimization of corrosion by concentrated sulfides, better uniformity of sulfidation, etc. Lower concentrations of sulfide gas in the first stage and less total quantity of sulfide can be employed, moreover, than are required for best quality products obtained in a one-stage operation with dilute sulfide gas. The final cleanup with a small volume of concentrated sulfide for a short time assures uniform and complete sulfidation and permits reduction in total sulfide employed as well as in the total treating time required in a one-stage operation with comparative results.

It was also found in using the described two-stage operation that lower treating temperatures could be employed to effect equivalent sulfidation than in a one-stage operation with substantially equal iron removal by subsequent acid leaching. With the type of clay of the above example, although lower temperatures can be used, nevertheless, catalysts of lowest residual iron and maximum activity are obtained with sulfidation at about 1350-1400° F. The content of CO and $H_2$ as well as $CO_2$ in a flue gas carrier has a less marked influence on sulfidation by the described two-stage treatment than in a one-stage treatment with dilute sulfiding gas.

The results obtained with treatments made on sub-bentonite and other clays of various origin indicate the general applicability of the described process and conditions of operation. Although there were individual variations, it was found that reasonably low residual iron in the modified clay could be readily obtained under the conditions given; in some instances this may necessitate more drastic treatment than in the case of the illustrated clay, as by the employment of the longer treating time, to about 5 hours, and/or somewhat higher concentrations of sulfide in the first stage operation as up to 3 to 5% of the treating gas or 4 to 6 times the iron equivalent of the clay.

Obviously many modifications and variations of the invention as hereinbefore set forth may be made without departing from the spirit and scope thereof and therefore only such limitations should be imposed as are indicated in the appended claims.

I claim as my invention:

1. The process of sulfiding solid mineral material containing components reactive to form metallic sulfides, which comprises initially heating such a mineral material by contact with comparatively large volumes of a treating gas introduced into a primary treating zone, said gas being composed of a preheated essentially inert carrier gas containing gaseous sulfide in dilute concentration therein, maintaining contact between said mineral material and said treating gas in said primary treating zone for a period at least sufficient to heat said mineral material to desired reaction temperature and simultaneously effecting thereby the initial sulfidation of said reactive components, and thereafter contacting the thus heated material with a comparatively small volume of concentrated sulfiding gas for a controlled period in a subsequent treating zone by introduction of said concentrated sulfiding gas into said subsequent treating zone under independently controlled conditions and at a temperature lower than that of the mineral material introduced in said subsequent zone thereby perfecting the sulfiding reaction initiated in said primary treating zone; the concentration of gaseous sulfide in the concentrated sulfiding gas employed in said subsequent treating zone being considerably greater than that in said treating gas employed in the primary treating zone.

2. The process in accordance with claim 1 wherein said mineral material comprises an iron-containing clay.

3. The process in accordance with claim 2 wherein said heated treating gas contains hydrogen sulfide in a weight ratio to the iron content of the clay of from about 0.8 to about 1.6.

4. The process in accordance with claim 2 wherein the iron content of the clay is subsequently removed by mild acid leaching to provide a modified clay product of low iron content and improved catalytic property.

5. The process in accordance with claim 2 wherein said heated treating gas contains about 0.7% to 2.1% of hydrogen sulfide by volume and said concentrated sulfiding gas contains 15 to 50% by volume of hydrogen sulfide.

6. The process in accordance with claim 2 wherein said treatment with concentrated sulfiding gas is effected in 5 to 15 minutes.

7. The process in accordance with claim 1 wherein the contacting of said mineral material with the heated treating gas and with said concentrated gaseous sulfide as defined is effected by a continuous process wherein said mineral material is continuously passed as a moving bed through a plurality of treating zones counter-current to the respective treating gases aforesaid moving through said zones.

8. The process in accordance with claim 7 wherein said heated treating gas is introduced at a temperature and permitted to contact said mineral for a time sufficient to heat said mineral material to at least 1350° F.

9. The process in accordance with claim 8 wherein said heated treating gas is retained in counter-current contact with the moving bed of mineral material at said recited minimum temperature for about one-half hour to over 5 hours.

10. The process of treating iron-containing clay with gaseous sulfide at elevated temperature to convert the iron present therein to iron sulfide, which comprises passing a solid moving bed of said clay through a primary treating zone in counter-current contact with heated dilute sulfide gas introduced into said zone at a temperature and maintained in contact with the clay for a time sufficient to heat the clay to desired sulfiding temperature by direct heat exchange therewith, thereby effecting initial and at least partial sulfidation of the iron content of said clay, said dilute sulfide gas being composed of an essentially inert carrier gas containing a gaseous sulfide in dilute concentration therein; continuously withdrawing the thus heated and sulfided clay from said primary treating zone into a subsequent treating zone of reduced cross section, introducing concentrated gaseous sulfide into said subsequent treating zone at a temperature lower than that of the clay entering said zone and contacting the hot clay in said latter zone with said cooler gaseous sulfide to complete and perfect the sulfidation of any incompletely reacted iron therein, and discharging the thus sulfided clay.

11. The process in accordance with claim 10 wherein said heated dilute sulfide gas contains as active sulfiding constituent an amount of hydrogen sulfide several times in excess of the theoretical requirement for complete sulfidation of the iron content of the clay.

12. The process in accordance with claim 10 wherein said heated dilute sulfide gas is composed predominantly of nitrogen and contains up to 15% by volume carbon dioxide and small quantities of carbon monoxide and hydrogen not in excess of 4% by volume of the total gas.

13. The process in accordance with claim 10 wherein said clay is heated in said primary treating zone to at least 1350° F.

14. The process in accordance with claim 10 wherein said heated dilute sulfide gas employed in said primary treating zone is formed by admixture of a heated carrier gas directly introduced into said zone with concentrated sulfide gas previously contacted with hot clay in said zone of reduced cross-section.

15. The process in accordance with claim 14 wherein said heated carrier gas directly introduced in said primary treating zone is composed of an essentially inert gas containing up to 2% of hydrogen sulfide.

16. The process of sulfiding at elevated temperature solid mineral material containing components reactive to form metallic sulfides, which comprises continuously introducing such mineral material into a heating and primary treating zone to form a continuous downwardly moving bed in said zone, passing the mineral materials from said zone to a second zone constituting a concentrated treating zone, maintaining the mineral material in said concentrated treating zone as a moving mass for a comparatively short period of time, discharging the treated mineral material from said second zone downwardly as a continuous column of narrow cross-section, introducing concentrated sulfide gas directly into said column, introducing essentially inert seal gas into said column below the point of introduction of said concentrated sulfide gas at a pressure greater than that existing in said treating zones to cause upward movement of said seal gas toward said zones, said seal gas in its upward movement admixing with said concentrated sulfide gas directly introduced into said column, said admixed gases flowing upwardly into said concentrated treating zone in counter-current contact to the descending mineral materials in said zone; introducing directly into said primary treating zone heated diluent gas at a temperature not less than the desired reaction temperature, said diluent gas consisting of an essentially inert carrier gas containing a small amount of gaseous sulfide; admitting the admixed gases from said concentrated treating zone into said primary zone and diffusing the same in admixture with the heated diluent gas directly introduced therein to form a hot diluted heating and primary treating gas mixture flowing upwardly through said primary treating zone in counter-current contact with the downwardly moving bed of mineral material in said zone, disengaging spent gases from said mineral material above said primary treating zone and discharging the same; discharging the sulfided mineral material from said continuous column of narrow cross-section, said seal gas preventing discharge of sulfide gas with said mineral material.

17. The process of improving the properties of acid-activated sub-bentonite clays containing iron compounds not removed during acid-activation, which comprises passing such a clay in the form of agglomerated masses downwardly as a continuously moving bed through a heating and primary treating zone, contacting the moving bed of clay in said zone with heated treating gas, said gas being composed of an essentially inert carrier gas and hydrogen sulfide in a concentration of about 0.75% to 2.0% by volume of the total heated treating gas, the heated treating gas being at a sufficiently high temperature and being introduced in sufficiently large volume to effect heating of the clay to at least 1350° F. and not above 1450° F., within said heating and primary treating zone; passing the thus heated and at least partially sulfided clay into a cleanup zone in counter-current contact with a comparatively small volume of concentrated sulfiding gas to assure complete sulfidation of the iron content of the clay, said concentrated sulfiding gas being at a temperature lower than that of the clay passed into said clean-up zone and containing at least 25% by volume hydrogen sulfide, further cooling the thus sulfided clay, and thereafter acid leaching the cooled clay to remove iron sulfides formed therein.

18. The process of sulfiding granular clay containing components reactive to form metallic sulfides, which comprises passing said clay downwardly as a continuous moving bed through a path constituting a heating and primary treating zone and thence for a comparatively shorter time through a path constituting a concentrated treating zone, introducing concentrated sulfide gas into the latter zone at a low volumetric rate, flowing said concentrated gas upwardly and in countercurrent contact with the clay passing through said concentrated treating zone to assure and perfect the completion of the sulfidation reaction initiated in said primary treating zone, directly introducing into said primary treating zone hot diluent gas composed predominantly of inert constituents to effect heating of said clay in said primary treating zone to desired temperature, said concentrated sulfide gas admixing with said hot diluent gas in said primary treating zone and the admixture thus formed flowing upwardly through said primary treating zone as a diluted sulfiding gas effecting heating of said clay by direct heat exchange in counter-current contact therewith and initiating sulfidation of a component of said clay at elevated temperature; said hot diluent gas being introduced into said primary treating zone over a wide area providing obstructions to flow thereby effecting diffusion of said gas through the moving bed of clay in said zone and minimizing localized channeling of the gas; discharging spent gases above said primary treating zone and discharging the thus sulfided clay below said concentrated treating zone.

19. The process in accordance with claim 18 wherein said hot diluent gas is introduced into said primary treating zone, by providing a continuous layer of said gas circumferentially surrounding said moving bed of clay in said zone along a substantial portion of the longitudinal extent of said bed, and directing said surrounding gas inwardly in a multiplicity of paths over said area providing obstructions to flow.

HUBERT A. SHABAKER.

REFERENCES CITED

The following references are of record in the file of this patent:

UNITED STATES PATENTS

| Number | Name | Date |
|---|---|---|
| 1,368,396 | Hulett | Feb. 15, 1921 |
| 1,727,441 | Parentani | Sept. 10, 1929 |
| 1,816,842 | Haglund | Aug. 4, 1931 |
| 2,388,302 | Weyl | Nov. 6, 1945 |
| 2,466,046 | Shabaker | Apr. 5, 1949 |
| 2,466,047 | Shabaker | Apr. 5, 1949 |
| 2,466,048 | Shabaker | Apr. 5, 1949 |
| 2,528,553 | Royster | Nov. 7, 1950 |
| 2,533,142 | Royster | Dec. 5, 1950 |